Figure 1:
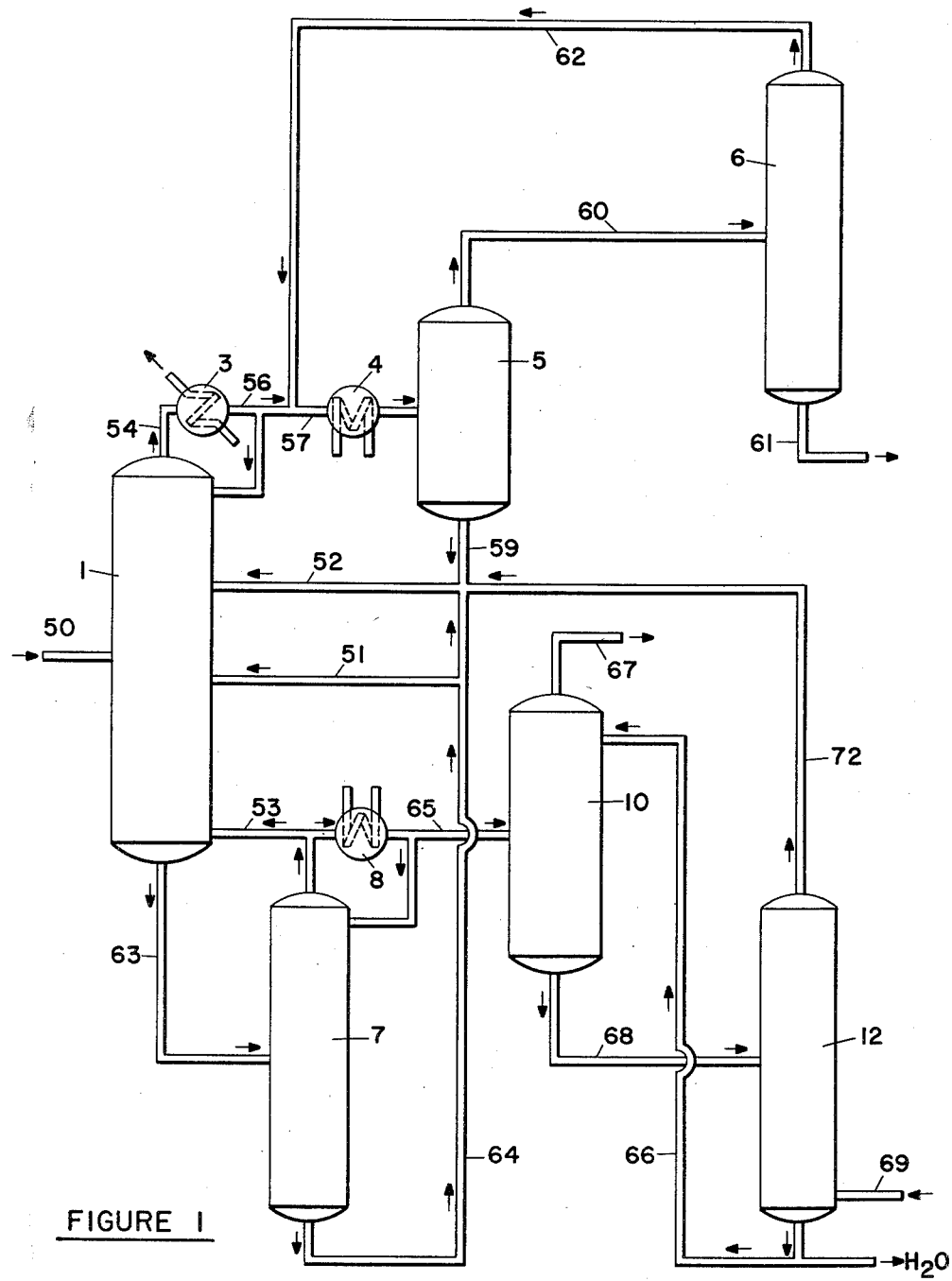

Aug. 21, 1962  M. R. FENSKE ETAL  3,050,448
SEPARATION OF HYDROCARBONS
Filed March 27, 1958  2 Sheets-Sheet 1

Merrell R. Fenske
Robert H. McCormick   Inventors
Harry Lawroski
By Seymour Stahl Attorney Merrell R. Fenske
Robert H. McCormick  Inventors
Harry Lawroski

3,050,448
SEPARATION OF HYDROCARBONS
Merrell R. Fenske, Robert H. McCormick, and Harry Lawroski, State College, Pa., assignors to Esso Research and Engineering Company, a corporation of Delaware
Filed Mar. 27, 1958, Ser. No. 724,367
10 Claims. (Cl. 202—39.5)

This invention relates to the separation of less saturated compounds from more saturated compounds by a combination of a vapor-liquid extraction process using liquid ammonia as the principal component of the solvent to co-mingle with the compounds to be separated; a distillation process, usually azeotropic; and usually a cooling process in conjunction with the distillation process.

The function of the distillation and cooling processes is to free at least a part of the ammonia from the compounds with which it was associated in the vapor-liquid extraction step.

Another important feature of this separational process is the use of controlled amounts of water in the liquid ammonia. This water is used to enhance the separation in the vapor-liquid extraction step between any pair of components to be separated. It is also used to increase the volatility of the components so their separation from ammonia is easier in the distillation step. Finally, it is useful in the cooling step because the presence of water in the liquid ammonia, containing dissolved components, reduces their solubility in ammonia and so less cooling is needed to effect any given degree of precipitation of a component from the ammonia solvent.

In carrying out this process the vapor-liquid extractor, wherein the separation of the components occurs, usually consists of two zones. One zone, located above the point where the feed mixture is introduced, is a stripping zone. It functions to remove or strip from the feed mixture the least volatile components of the mixture to be separated so that only the more volatile components are allowed to pass out of the top of the vapor-liquid extractor. The other zone, located below the point of feed introduction, is an enriching zone. Its function is to remove the more volatile components and enrich the mixture in the less volatile components, so only these are in the liquid ammonia solvent as it leaves the base of the vapor-liquid extractor.

Usually the concentration of water in the ammonia is controlled so as to be different in these two zones. The upper zone usually contains less water in the liquid ammonia solvent than the lower zone. The ability to alter this water concentration in a definite and controlled manner is an important feature of this invention.

More particularly, this invention relates to the separation of less saturated $C_2$ to $C_5$ hydrocarbons from more saturated $C_2$ to $C_5$ hydrocarbons employing liquid ammonia as the solvent whereby the more saturated hydrocarbon is made more volatile and is removed as overhead product in a substantially azetropic composition with ammonia from the vapor-liquid extractor and the less saturated hydrocarbon is removed as the bottom product, with the remainder, or the other portion, of the ammonia solvent.

In preferred embodiments of this invention propylene is separated from propane by this novel process, as well as butenes from butanes or butadiene from butenes and butanes.

This invention is applicable to the separation of olefins and/or diolefins and/or acetylenes from saturated compounds varying in size from two to about five carbon atoms, particularly where the less saturated compound contains the same number of carbon atoms as the more saturated compound. However, for ease of discussion and for purposes of illustration, the process will be described with reference to the separation of propylene from propane, of butylenes from butanes, and of butadiene from butylenes. The process is also useful for the separation of acetylenic compounds from olefins and diolefins of similar boiling points.

In accordance with this invention, liquid ammonia is intended to be ammonia that is between about 85 to 100% in purity, the other materials being water or other inert substances such as hydrocarbons. By commingling in the liquid phase controlled amounts of ammonia with the vaporous hydrocarbon mixtures to be separated that have different degrees of unsaturation, the relative volatility of the hydrocarbon mixtures is altered markedly, thereby enabling their separation to be made in a practical manner. As in the case of a propylene-propane mixture, the normally less volatile compound, i.e. propane, in the presence of ammonia becomes the more volatile constituent. This invention also relates to a novel ammonia recovery system permitting an efficient and economical plant.

This is illustrated in Table 1. It shows the pronounced effect of the concentration of ammonia in the liquid phase on relative volatility. Without the presence of ammonia, the relative volatility of the propane:propylene binary is approximately 0.87. These data are for 95° to 120° F. and pressures of 350 to 400 p.s.i.a.

TABLE 1
*Relative Volatility of Propane to Propylene*

| Concentration in liquid phase, weight, percent | | Relative volatility |
|---|---|---|
| Hydrocarbon | Ammonia | |
| 70 | 30 | 1.07 |
| 50 | 50 | 1.25 |
| 30 | 70 | 1.5 |
| 20 | 80 | 1.6 |
| 10 | 90 | 1.8 |

The maintenance of the proper concentration of ammonia in the liquid phase is accomplished by introducing controlled amounts of liquid ammonia in the upper portion of the vapor-liquid countercurrent extraction tower. As this ammonia stream descends, it selectively removes propylene from the ascending vapors. Thus propane concentrates in the upper portion of the tower or extractor, and propylene at the bottom. The mixture of propane and propylene to be separated is introduced at an intermediate point in the tower. In general, the less saturated hydrocarbon is removed from the bottom of the extraction tower as an extract comprising a major portion of ammonia and a minor portion of the less saturated component. The more saturated hydrocarbon is removed overhead as raffinate preferably comprising azeotropic proportions of the hydrocarbon and ammonia.

Another novel step in the process of this invention is the manner in which the ammonia solvent is separated from each of the components having different degrees of unsaturation. This has to be accomplished in an economical and practical way so the ammonia solvent can be recycled again to the vapor-liquid extraction tower to separate additional mixture.

A large portion of the ammonia is recovered from the extract by azeotropic distillation in a tower wherein the ammonia and less saturated hydrocarbon form a minimum boiling point azeotrope. The bottoms from this tower are pure ammonia of a quality suitable for reintroduction in the vapor-liquid extraction tower. The distillate from this distillation tower preferably an ammonia azeotrope is further separated (a) by cooling to form two liquid phases of different composition, or (b) by washing it to remove selectively one of the components. For example, the ammonia azeotrope can be washed with water to dissolve out the ammonia and free the hydrocarbon originally associated with the ammonia in the azeotrope. Or the ammonia azeotrope can be washed with an oil to dissolve the hydrocarbon and free the ammonia.

For the purpose of defining the invention with more particularity, reference may now be made to FIGURE 1 which depicts in diagrammatic form a continuous process for the separation of propylene from propane.

EXAMPLE 1

The propane:propylene mixture comprising the hydrocarbon feed may vary in composition considerably, for example from 10 to 90 percent propylene and 10 to 90 percent propane. This feed mixture is passed via line 50 to the initial vapor-liquid extraction tower 1. This tower 1 may be constructed of any conventional design and preferably is one that has 20 or more theoretical plates, or countercurrent vapor-liquid extraction stages.

In the specific example of FIGURE 1, the hydrocarbon feed mixture is selected to be 50% propane and 50% propylene. Concomitantly liquid ammonia is introduced into tower 1 via line 51 and 52 at 90° to 120° F. The hydrocarbon feed is also introduced at about this temperature. Tower 1 operates at about 110° F. and 420 p.s.i.a.

The weight ratio of liquid ammonia solvent to hydrocarbon feed may vary depending on the tower or extractor design and the degree of separation, or purity desired, in the products. In the present instance, as noted in Table 2, 560.7 lbs. of ammonia are introduced via line 52 per 100 lbs. of hydrocarbon feed introduced via line 50.

Of primary importance is the concentration of ammonia in the liquid phase in tower 1, as illustrated by the data in Table 1. It is preferred that the ammonia content in this liquid phase be in the range of at least 50 wt. percent or more to get a high relative volatility, i.e., to enhance the separation between propylene and propane. Of course, the proportion of ammonia used has to be balanced against the amount of energy or heat required to separate this ammonia from the propane- and propylene-rich streams.

Tower 1 is heated at its base by an conventional means. This boils some of the liquid in the bottom of tower 1. This boiling temperature is about 110° F. as noted in Table 2.

The upper portion of tower 1 above line 52 has additional plates, or vapor-liquid contacting means to enable the vapors ascending above position 52 to be fractionated to reach closely the propane:ammonia azeotrope. This azeotrope at the tower operating pressure of 420 p.s.i.a. and temperature of about 110° F. contains about 30 wt. percent ammonia and 70 wt. percent propane. This composition is about opposite to that prevailing in the liquid phase of tower 1, where the liquid may contain 70 wt. percent or more of ammonia and the balance hydrocarbon.

This vaporous azeotrope leaving tower 1 via line 54 is condensed in condenser 3. The bulk of this liquid azeotrope is returned to the top of tower 1 as reflux which will be about 5–10/1. The remainder, containing the net forward flow of hydrocarbon, passes out through line 56.

TABLE 2

*Operating Conditions for FIGURE 1*

[All pressures=420 p.s.i.a. Basis: 100 pounds of hydrocarbon feed with 50 wt. percent propane:50 wt. percent propylene]

| Stream No. | Flow rate, lbs. per 100 lbs. of feed | Approx. temperature, ° F. | Approx. stream composition, weight percent | | |
|---|---|---|---|---|---|
| | | | Ammonia | Hydrocarbon | Water |
| 50 | 100 | 100 | | 100 | |
| 51 | 300 | 110 | 100 | | |
| 52 | 560.7 | 110 | 99.8 | 0.2 | |
| 56 | 73.1 | 110 | 30 | 70 | |
| 59 | 23.1 | 110 | 95 | 5 | |
| 60 | 60.0 | 110 | 5 | 95 | |
| 61 | 50.0 | 175 | | 100 | |
| 62 | 10.0 | 110 | 30 | 70 | |
| 63 | 1,269.1 | 110 | 75 | 25 | |
| 64 | 816.1 | 147 | 100 | | |
| 65 | 71.5 | 110 | 30 | 70 | |
| 66 | 64.5 | 80 | | | 100 |
| 67 | 50.0 | 80 | | 100 | |
| 68 | 86.0 | 100 | 25 | | 75 |
| 69 | 14.1 | 456 | | | 100 |
| 72 | 21.5 | 147 | 100 | | |

The propane concentrate, or propane:ammonia azeotrope flows via lines 56 and 57 to cooler 4. Here the ammonia:propane mixture is cooled by refrigeration, or by self evaporation under adiabatic conditions, to about 20° F. At this temperature the mixture now separates into two liquid phases. One phase contains about 95 wt. percent hydrocarbon (propane) and 5 wt. percent ammonia. It is drawn off settler 5 through line 60. The other liquid phase contains about 95 wt. percent ammonia and 5 wt. percent hydrocarbon (essentially propane), and it leaves settler 5 via line 59. Heat exchangers are omitted for the sake of simplicity.

Stream 59 is introduced into the upper part of vapor-liquid extractor 1, via line 52.

Stream 60 from cold settler 5, goes into a distillation tower 6 operating at the same pressure as tower 1, namely about 420 p.s.i.a. In tower 6 the feed in line 60 is fractionally distilled into an overhead product, 62, containing the ammonia-hydrocarbon azeotrope having 30 wt. percent ammonia and 70 wt. percent hydrocarbon, at 420 p.s.i.a., and 100° F.; bottoms ammonia-free product, 61, consisting of 95% propane and 5% propylene. This is the finished product and it goes to storage.

The product in line 62, containing 30 wt. percent ammonia is recycled via line 57 through cooler 4 and cold settler 5 so that it ultimately is separated, as described.

Returning to the vapor-liquid extractor 1, the ammonia-rich bottom stream leaves via line 63 and contains about 75 wt. percent ammonia and 25 wt. percent hydrocarbon, essentially propylene. In fractional distillation tower 7, operating at about 420 p.s.i.a., this mixture is separated into an overhead vapor containing about 30 wt. percent ammonia and 70 wt. percent hydrocarbon, essentially propylene. Part of these vapors return to extractor 1, via line 53. The other part is condensed in condenser 8.

The bottoms from tower 7 are essentially pure liquid ammonia. They leave via 64 to be returned to extractor 1 via lines 51 and 52.

Stream 65 from tower 7 contains the net flow of the propylene-rich stream. It enters the lower portion of liquid-liquid extractor 10, where the ammonia contained in stream 65 is removed by solution in water which enters extractor 10 via line 66. The hydrocarbon, washed free of ammonia, leaves extractor 10 via line 67 to comprise the finished propylene product for storage.

The ammonia-water stream leaving the base of extractor 10 via line 68 into distillation tower 12, operating also at about 420 p.s.i.a. and about 147° F. at its top and about 450° F. at its bottom. This distillation tower is of the conventional type. It serves to remove the ammonia from the water. Pure ammonia is taken overhead, condensed, and returned via lines 72 and 52 to extractor 1.

Open steam is injected into the base of distillation tower 12 via line 69. It serves to strip the ammonia out of the feed stream. Pure liquid water leaves tower 12 via line 66, heat exchanged, and then introduced near the top of extractor 10 via line 66.

Solvent recovery tower 7 contains the equivalent of about 10 or more theoretical stages or plates.

Tower 10 may, if desired, be operated as a vapor-liquid extraction tower by injecting vaporous feed via line 65 under suitable pressures and temperatures. Also, if desired, a higher boiling hydrocarbon oil, e.g. heptane or cyclohexane, may be employed to extract the propylene rather than extracting the ammonia. In this case the hydrocarbon oil-propylene mixture would be separated by distillation recycling the hydrocarbon oil in an obvious manner not shown.

Table 2 presents typical operating conditions for a feed consisting of 50 wt. percent propane and 50 wt. percent propylene and separating it into a product, 61, containing 95 wt. percent propane and 5 wt. percent propylene, and the other product, 67, containing 95 wt. percent propylene and 5 wt. percent propane.

EXAMPLE 2

The separation of butylenes from butanes is similar to the above example. As in the previous example, the extraction is of a vapor-liquid type wherein the more saturated hydrocarbons are taken overhead from the extraction tower with ammonia preferably as a near azeotropic composition. The main extract comprising large amounts of ammonia and butene is recovered as bottoms from the extraction tower and passed to an azeotropic distillation tower as before. With a 50:50 butane-butene mixture the overhead from the primary extraction tower will comprise approximately 45% hydrocarbon and 55% ammonia, the hydrocarbon being primarily butanes. The extract taken from the bottom of the tower will comprise approximately 25% hydrocarbon in ammonia, the hydrocarbon comprising principally butene. The raffinate or overhead composition is cooled and ammonia which separates into a lower phase is recycled to the extraction tower. The hydrocarbon comprising small amounts of ammonia is then azeotropically distilled to recover as bottoms from the distillation tower, such as tower 6 in FIGURE 1, relatively pure butane with the ammonia-butane azeotrope recovered from this distillation tower being recycled to the separator. The treatment of the extract phase is also similar to the prior example, the mixture being distilled in the tower similar to 7 in FIGURE 1 with substantially pure ammonia being recovered from the bottom of this azeotropic distillation tower and recycled to the extraction tower. After recycle and reflux the azeotropic composition taken overhead from the distillation tower is passed to a series of recovery towers. Cyclohexane in an amount of about 2 volumes per volume of ammonia-hydrocarbon mixture is employed to wash out the butylenes and to separate relatively pure ammonia which is recycled to the main extractor. The wash oil-butylene mixture containing a small amount of ammonia is then conventionally distilled to recover substantially pure butylene and wash oil for re-use. In this embodiment it is advantageous to maintain small amounts of water in the extraction tower to reduce the solubility of the hydrocarbon in ammonia and to increase the volatility of the butanes permitting an easy separation overhead of the more saturated compounds. As the wash oil, it is preferable to employ a stable hydrocarbon having a normal boiling point in the range of 150 to 250° F. Typical conditions within the main extraction tower included 110° F. at a pressure of 290 p.s.i.a. Pressure throughout the system may be varied considerably, however, at about 290 p.s.i.a. efficient separation may be effected without excessive heat requirements. It is to be understood that various heat exchange devices may be employed to take advantage of the heat or lack of heat in the various streams.

The use of water in the ammonia solvent is advantageous because it increases the volatility of the hydrocarbons relative to ammonia in the ammonia solvent. It also reduces the solubility of the hydrocarbons in the ammonia solvent. Consequently a chilling process is a very attractive means to separate the hydrocarbon-ammonia mixture into two phases. Chilling is a simple, one step, procedure. It requires much less energy than a vaporization process.

It is also advantageous to have the water content of the ammonia solvent in the enriching section greater than in the stripping section. This is done by partially vaporizing some of the ammonia solvent, containing water, in line 51. The vaporous portion will have essentially no water and it ascends through the stripping section. The liquid portion will be enriched in water and it will descend through the enriching section.

EXAMPLE 3

Figure 2:
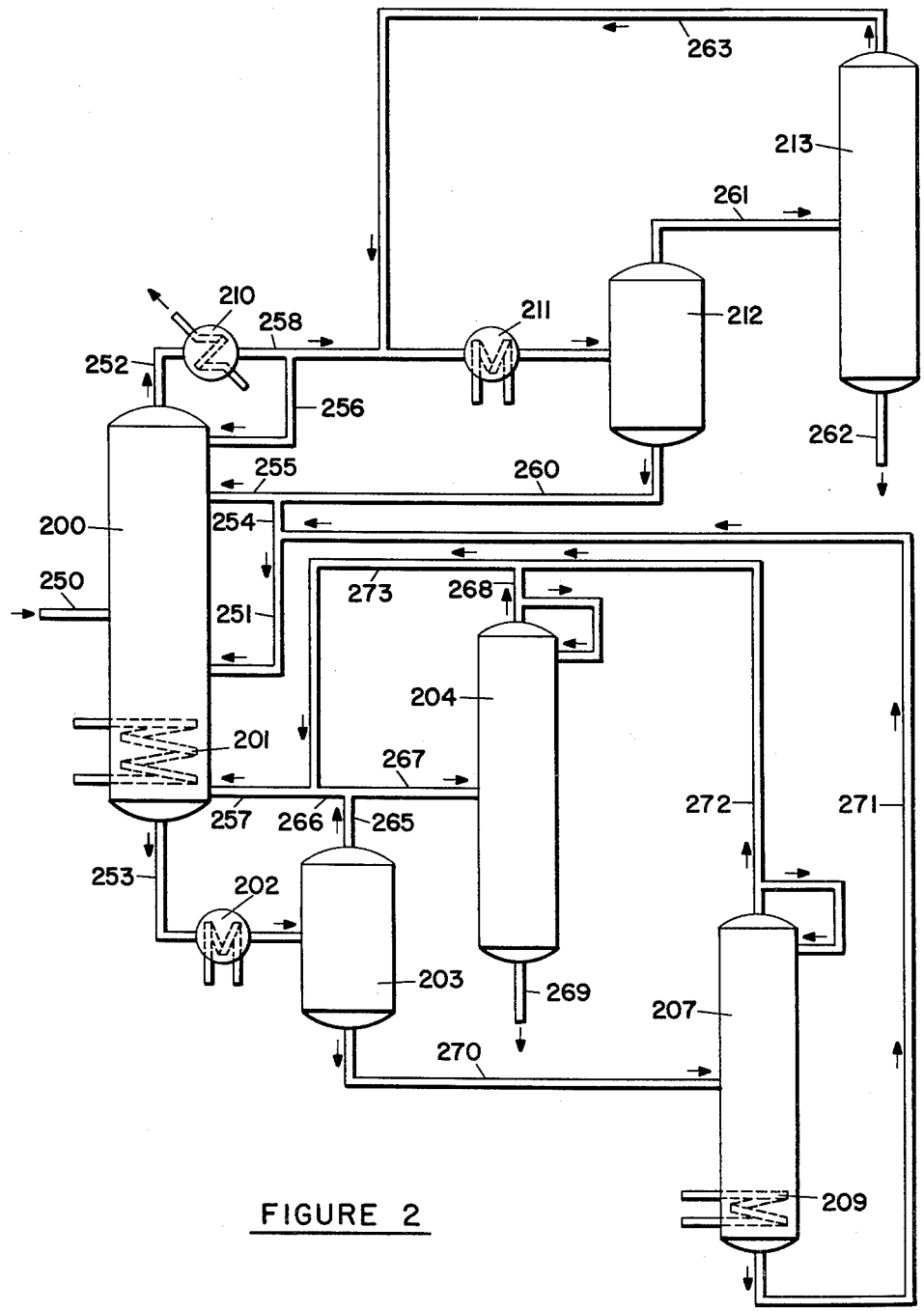

This relates to the separation of butadiene from butenes and is illustrated in FIGURE 2. Tower 200 is a countercurrent vapor-liquid contactor or extractor having the two sections, or zones. These are the upper or stripping section and the lower or enriching section.

For purposes of illustration the feed is a 50:50 mixture of butadiene and butenes, and is introduced into tower 200 via line 250. The butadiene-rich product, containing 95% butadiene and 5% butenes for illustration, is removed via line 269. The butene-rich product containing 95% butenes and 5% butadiene leaves via line 262.

To effect this separation, liquid ammonia solvent is introduced into tower 200 via lines 256, 255 and 251. This solvent comprises essentially liquid ammonia, either substantially anhydrous or containing from about 10 to 20 wt. percent water. In addition to the countercurrent vapor-liquid enriching and stripping zones in tower 200, there is a small section above line 255 which is essentially the more conventional distillation zone. It is the purpose of this small distillation zone to fractionate the ammonia-butenes vapors entering it so that the ammonia-butenes azeotrope is approached. Normally no significant separation of butenes from butadiene occurs in this small distillation zone. The butenes-butadiene separation occurs in tower 200 below line 255, i.e. in the two sections or zones previously designated as the stripping and enriching zones. In these latter two zones the concentration of ammonia solvent in the liquid phase descending through tower 200 is maintained at about 70 to 90 wt. percent by controlling the proportions of ammonia solvent (fed in lines 256, 255, and 251) to the hydrocarbon mixture introduced in line 250.

In the present illustration tower 200 operates at about 280 p.s.i.a. and at about 110° F.

In the stripping section of tower 200, i.e. that portion between lines 250 and 255, the ammonia solvent contains about 3 to 5% water. In the enriching section, i.e. that portion below line 250, the ammonia solvent contains about 6 to 8% water. The manner in which this water content is varied will be subsequently described. As indicated earlier, this use of water is advantageous because it permits the bottom and top streams from tower 200 to be separated by cooling so each liquid layer can be used at optimum efficiency in this separation cycle, while at the same time reducing the energy and equipment costs for making this separation.

The use of water in the ammonia solvent at concentrations above about 5% in the stripping section produces a higher content of butenes in the vapor than is present in the butenes-anhydrous ammonia azeotrope at a given pressure. Consequently, the small conventional distillation section between lines 255 and 256, in tower 200, can be eliminated, and lines 255 and 256 superimposed.

Tower 200 is equipped with reboiler 201 which generates part of the vapor stream that ascends the tower and ultimately leaves via line 252.

The descending liquid stream leaves tower 200 via line 253. It contains about 73.5 wt. percent ammonia, 18.4 wt. percent of butadiene (containing a small proportion of butenes), and 8.1 wt. percent water. It flows into cooler 202 where its temperature is reduced from about 110° F. to about —20° F.

This cooling causes the stream to separate into two liquid layers and these are separated and disengaged in separator 203. The top or light layer leaves separator 203 via line 265. It contains about 75 wt. percent butadiene plus 25 wt. percent ammonia. The lower liquid layer leaves via line 270. It contains about 85.3 wt. percent ammonia, 4.5 wt. percent butadiene, and 10.2 wt. percent water.

Stream 265, the butadiene-rich phase, is diverted into two other streams. One of these, 266, is returned to the base of tower 200 via line 257. The other portion, containing the net production of butadiene, flows via line 267 into distillation tower 204.

Tower 204 fractionates the contents of stream 267 into an overhead vapor rich in ammonia. Part of these vapors are condensed in a condenser not shown, and this reflux condensate is returned to the top of distillation tower 204. The remainder of the vapors passes through line 268, thence through line 273, and finally is returned to the base of tower 200 via line 257.

The bottoms stream 269 from tower 204 is the butadiene stream free of ammonia. It goes to storage.

Tower 204 is fitted at its base with the usual reboiler which generates vapors so that all the ammonia is expelled overhead from tower 204.

The heavy phase from separator 203 leaves via line 270 after being suitably heat exchanged (not shown) to recover the refrigeration in it. This is the ammonia-rich phase. It flows into distillation tower 207 which is equipped with the usual condenser and reboiler. In tower 207 all the butadiene passes overhead as a vapor. Part of this overhead vapor stream containing from about 30 to 50% butadiene, with the balance ammonia, passes out through lines 272 and 273 to be introduced near the base of tower 200 via line 257. A smaller portion of these overhead vapors flow into a condenser to produce a reflux condensate for return to the top of distillation tower 207.

Reboiler 209 generates the vapors to expel overhead all the butadiene in stream 270.

The liquid bottoms in tower 207 contain about 88.2 wt. percent ammonia and 11.8 wt. percent water. They leave via line 271, which is subsequently split into two other streams 251 and 254, both of which are reintroduced into tower 200. The portion in line 254 provides the means to introduce a controlled amount of water in the ammonia solvent in the stripping zone of vapor-liquid extractor 200. The portion in line 251 serves to enrich this water content so the enriching section has a higher content of water than the stripping section.

The vapors generated by reboiler in tower 200, plus those introduced via line 257, pass upward against the descending liquid stream that contains from 70 to 85% ammonia solvent. This solvent dissolves preferentially the butadiene so that the vapors, as they proceed up through tower 200, become richer in butenes.

The vapors leave tower 200 via line 252. They flow into condenser 210, where they are liquefied by cooling. Part of this condensate is returned at the top of tower 200 via line 256. The other part flows through line 258 into cooler 211 where they are cooled from about 110° F. to about —20° F.

This cooling causes this liquid stream to separate into two liquid phases. These are separated in separator 212. The top or light phase contains about 95% butenes (plus a small proportion of butadiene) and about 5% ammonia. It leaves separator 212 via line 261.

The bottom, or heavy phase, in separator 212 contains about 95% ammonia and 5% butenes. It leaves via line 260 and is returned to tower 200 via line 255.

The light phase in line 261, which is rich in butenes and contains the net production of butenes, flows into distillation tower 213, which is fitted at its top with the usual condenser, and a its base with a reboiler which generates vapors to strip the small amount of ammonia out of the butenes, so that butenes, free of ammonia, leave via line 262 for storage.

Tower 213 fractionates the ammonia-butenes mixture to essentially the azeotrope. All of the equipment in FIGURE 2 operates at about 280 p.s.i.a. The overhead from tower 213 flows via line 263 to join the liquid in line 258 and enter cooler 211, where the production of two liquid phases occurs by cooling. The disposition of these two liquid phases from separator 212 has already been described.

Table 3 presents information of the flow quantities, compositions, and temperatures for the different streams portrayed in FIGURE 2.

The butenes may also contain butanes without jeopardizing the separation of pure butadiene. The butanes will accompany the butenes and the same operations described in Example 2 apply.

It should also be understood that the ammonia solvent in addition to having varying amounts of water in it, may also contain small amounts of inert hydrocarbons, other than those being separated. For example, the ammonia solvent in the flow plan of FIGURE 2 may contain small amounts of aromatics to expedite the settling or phase separation in cold settler 203.

Ethylene can be separated from ethane, and 5-carbon atom hydrocarbons having varying degrees of unsaturation can be separated by the process described. These may be the separation of 5-carbon atom diolefins from pentenes, or pentenes from pentanes.

The relative volatility (as previously defined) between trans butene-2 and 1,3-butadiene was experimentally determined to be 1.45 when the liquid phase contained 34 weight percent hydrocarbon and the remainder was liquid ammonia at 70° F. and about 135 p.s.i.a. The trans butene-2 is the more volatile component of these two hydrocarbons in the presence of liquid ammonia. The relative volatility between the key component pairs cis-butene 2:1,3-butadiene and n-butane:isobutylene would be approximately the same value at comparable liquid compositions with respect to ammonia. n-Butane is the more volatile component when the liquid phase contains 70% or more of ammonia. These components represent the most difficult separations since normally in an olefin:diolefin mixture the cis-butene-2 is the highest boiling component, and in a C–4 saturate:olefin mixture the n-butane is the highest boiling, while the isobutylene is the lowest boiling component. The use of liquid ammonia as a solvent reverses these volatilities. It is not possible to produce pure butadiene from a mixture containing butanes and butenes by distillation alone.

TABLE 3

*Operating Conditions for FIGURE 2*

[All pressurea=bout 280 p.s.i.a. Basis: 100 pounds of hydrocarbon feed with 50 wt. percent C-4 olefins:50 wt. percent C-4 diolefins]

| Stream No. | Flow rate, lbs. per 100 lbs. of feed | Approx. temperature, °F. | Approx. stream composition | | |
|---|---|---|---|---|---|
| | | | Ammonia | Weight percent hydrocarbon | Water |
| 250 | 100 | 100 | | 100 | |
| 251 | 453.1 | 110 | 88.2 | | 11.8 |
| 252 | 1,138 | 110 | 70 | 30 | |
| 253 | 1,054.6 | 110 | 73.5 | 19.4 | 8.1 |
| 254 | 278.9 | 110 | 88.2 | | 11.8 |
| 255 | 418.9 | 110 | 90.4 | 1.7 | 7.9 |
| 256 | 948 | 110 | 70 | 30 | |
| 257 | 272.9 | 110 | 47.2 | 52.8 | |
| 258 | 190 | 110 | 70 | 30 | |
| 259 | 193.8 | −20 | 70 | 30 | |
| 260 | 140 | 110 | 95 | 5 | |
| 261 | 53.8 | 110 | 5 | 95 | |
| 262 | 50 | 246 | | 100 | |
| 263 | 3.8 | 110 | 70 | 30 | |
| 264 | 1,054.6 | −20 | 73.5 | 18.4 | 8.1 |
| 265 | 207.5 | −20 | 25 | 75 | |
| 266 | 127.7 | 110 | 25 | 75 | |
| 267 | 79.8 | 110 | 25 | 75 | |
| 268 | 29.8 | 110 | 67 | 33 | |
| 269 | 50 | 232 | | 100 | |
| 270 | 847.4 | 110 | 85.3 | 4.5 | 10.2 |
| 271 | 732 | 132 | 88.2 | | 11.8 |
| 272 | 115.4 | 110 | 67 | 33 | |
| 273 | 145.2 | 110 | 67 | 33 | |

What is claimed is:

1. A vapor-liquid extraction process for separating less saturated hydrocarbons from more saturated hydrocarbons of substantially the same carbon content and having from 2 to about 5 carbon atoms, which comprises contacting a mixture of the said hydrocarbons in the vapor phase with a liquid ammonia solvent in a countercurrent vapor-liquid extraction zone wherein at least 150 wt. percent liquid ammonia is maintained in the liquid phase, said extraction zone having an upper stripping section and a lower enriching section, feeding the hydrocarbon mixture to be separated between said stripping and enriching sections, withdrawing from said upper section a hydrocarbon vapor stream containing the more saturated hydrocarbon and ammonia, and withdrawing from said lower section a hydrocarbon liquid stream containing the less saturated hydrocarbon and ammonia, cooling the hydrocarbon vapor stream to separate two liquid layers one of which is rich in ammonia and the other rich in hydrocarbon, returning a substantial part of the ammonia rich layer to the vapor-liquid extraction zone, recovering ammonia solvent from the liquid hydrocarbon stream, and returning the said recovered ammonia solvent to the said stripping section.

2. A method in accordance with claim 1 wherein said less saturated hydrocarbon is propylene and wherein said more saturated hydrocarbon is propane.

3. A method in accordance with claim 1 wherein said less saturated hydrocarbon is butadiene and wherein said more saturated hydrocarbon is butylene.

4. A method in accordance with claim 1 wherein said less saturated hydrocarbon is butylene and wherein said more saturated hydrocarbon is butane.

5. A vapor-liquid extraction process for separating a mixture of less saturated hydrocarbons from more saturated hydrocarbons having from 2 to about 5 carbon atoms, which comprises contacting vapors containing the said hydrocarbon mixture in a countercurrent vapor-liquid extraction zone having stripping and enriching sections, with an ammonia solvent introduced into the stripping section in such proportions that the liquid phase in the extraction zone contains at least 50 wt. percent ammonia for contacting the vapors from the hydrocarbon mixture that is introduced between the stripping and enriching sections, withdrawing from the upper part of the stripping section a hydrocarbon vapor stream containing the more saturated hydrocarbon and ammonia, and from the lower part of the enriching section a hydrocarbon liquid stream containing the less saturated hydrocarbon and ammonia solvent, recovering ammonia solvent from the said two hydrocarbon streams and reintroducing at least a portion of said ammonia solvent into the stripping section of the said vapor-liquid extraction zone.

6. The process of claim 5 wherein the hydrocarbon vapor stream containing the more saturated hydrocarbon and ammonia is cooled to separate a liquid phase rich in ammonia, and returning the said separated liquid phase to the upper part of the stripping section of the said vapor-liquid extraction zone.

7. A vapor-liquid extraction process for separating less saturated hydrocarbons from more saturated hydrocarbons having the same number of carbon atoms, said hydrocarbons having from 2 to 3 carbon atoms, which comprises contacting vapors containing the said hydrocarbon mixture in a countercurrent vapor-liquid extraction zone having stripping and enriching sections, with an ammonia solvent containing from about 5 to about 20 percent of water, introducing the said ammonia solvent into the stripping section in such proportions to the hydrocarbon mixture that the liquid phase in the extraction zone used to contact the said hydrocarbon vapors contains at least 60% of said ammonia solvent, introducing the said hydrocarbon mixture between the stripping and enriching sections, maintaining the water content of said stripping section below that of said enriching section, withdrawing from the upper part of the stripping section a hydrocarbon vapor stream containing the more saturated hydrocarbon and ammonia, and from the lower part of the enriching section a hydrocarbon liquid stream containing the less saturated hydrocarbon and ammonia solvent, recovering ammonia solvent from the said two hydrocarbon streams, and reintroducing the said recovered ammonia solvent into the stripping section of the said vapor-liquid extraction zone.

8. A vapor-liquid extraction process according to claim 7 in which the less saturated hydrocarbons and the more saturated hydrocarbons contains 3 carbon atoms.

9. A vapor-liquid extraction process according to claim 7 in which the weight ratio of ammonia solvent to hydrocarbons introduced into the vapor-liquid extraction zone is at least about 5:1.

10. A process for separating propylene from a mixture of propylene and propane which comprises continuously contacting vapors of said mixture with liquid ammonia solvent containing about 5 to 20 wt. percent water in a countercurrent vapor-liquid extraction zone having an upper stripping section and a lower enriching section at temperatures of about 90 to 120° F. and approximately 350 to 400 p.s.i.a. pressure, continuously introducing said ammonia solvent into said stripping section in such proportions that the liquid phase in said extraction zone contains at least 50 wt. percent ammonia, continuously withdrawing overhead from said extraction zone propane-ammonia azeotrope vapors, condensing said vapors and refluxing a part of said condensed vapors to the top of said extraction zone, cooling the unrefluxed part of the condensed vapors thereby causing the formation of two liquid phases one of which is rich in propane while the other is rich in ammonia, separating the ammonia-rich phase in a settling zone, heating the separated ammonia-rich phase to approximately the temperature of the extraction zone and introducing it into the stripping section of said extraction zone, distilling the propane-rich phase to recover an essentially ammonia-free propane as bottoms and ammonia-propane azeotrope overhead, cooling and recycling the ammonia-propane azeotrope taken overhead to said settling zone, continuously withdrawing an ammonia-rich mixture containing propylene from the bottom of the extraction zone, distilling the ammonia-rich mixture to recover essentially pure ammonia and a stream containing propylene and ammonia, recycling said pure ammonia to the stripping section of said extraction zone, extracting the ammonia in said stream containing propylene with water to recover ammonia-free propylene, distilling the water extract to recover the extracted ammonia overhead, condensing and recycling the ammonia taken overhead to the stripping section of the extraction zone.

References Cited in the file of this patent

UNITED STATES PATENTS

| | | |
|---|---|---|
| 1,866,800 | Deanesly | July 12, 1932 |
| 1,893,733 | Deanesly | Jan. 10, 1933 |
| 2,085,546 | Roelfsema | June 29, 1937 |
| 2,294,696 | Schmitkons | Sept. 1, 1942 |
| 2,370,063 | Nutting et al. | Feb. 2, 1945 |
| 2,371,350 | Nutting et al. | Mar. 13, 1945 |
| 2,408,947 | Nutting et al. | Oct. 8, 1946 |

OTHER REFERENCES

"Technique of Organic Chemistry, volume IV, Distillation," Interscience Publishers, Inc., New York, pages 338 and 339 relied upon.